(12) United States Patent
Delli Paoli et al.

(10) Patent No.: US 12,006,028 B2
(45) Date of Patent: *Jun. 11, 2024

(54) TRANSMISSION UNIT OF AN ANTI-TORQUE ROTOR FOR A HELICOPTER

(71) Applicant: LEONARDO S.P.A., Rome (IT)

(72) Inventors: Michele Delli Paoli, Samarate (IT); Fabio Nannoni, Samarate (IT); Roberto Vanni, Samarate (IT)

(73) Assignee: LEONARDO S.P.A., Rome (IT)

( * ) Notice: Subject to any disclaimer, the term of this patent is extended or adjusted under 35 U.S.C. 154(b) by 223 days.

This patent is subject to a terminal disclaimer.

(21) Appl. No.: 17/619,771

(22) PCT Filed: May 26, 2020

(86) PCT No.: PCT/IB2020/054979
§ 371 (c)(1),
(2) Date: Dec. 16, 2021

(87) PCT Pub. No.: WO2020/254895
PCT Pub. Date: Dec. 24, 2020

(65) Prior Publication Data
US 2022/0297832 A1    Sep. 22, 2022

(30) Foreign Application Priority Data

Jun. 17, 2019    (EP) .................................... 19180445

(51) Int. Cl.
*B64C 27/82*    (2006.01)
*B64C 27/12*    (2006.01)
*B64C 27/78*    (2006.01)

(52) U.S. Cl.
CPC .............. *B64C 27/78* (2013.01); *B64C 27/12* (2013.01); *B64C 27/82* (2013.01)

(58) Field of Classification Search
CPC .......... B64C 27/12; B64C 27/78; B64C 27/82
See application file for complete search history.

(56) References Cited

U.S. PATENT DOCUMENTS

| 2,490,784 A | 12/1949 | Davenport |
| 4,063,786 A | 12/1977 | Rall |

(Continued)

FOREIGN PATENT DOCUMENTS

| EP | 2 982 604 | 2/2016 |
| EP | 3216696 | 9/2017 |

(Continued)

*Primary Examiner* — Christopher D Hutchens
*Assistant Examiner* — Michael A. Fabula
(74) *Attorney, Agent, or Firm* — Leason Ellis LLP (57) ABSTRACT

An anti-torque rotor includes a mast rotatable about a first axis; a plurality of blades extending along respective second axes; and a control element sliding along the first axis with respect to the mast, integrally rotatable with said mast, and connected to said blades. A control rod slides axially along first axis and is angularly fixed with respect to said first axis. A connection element is interposed between the control rod and the control element and is configured to enable the relative rotation of said control element with respect to the control rod about the first axis. A transmission unit is available in an active configuration or an inactive configuration. The transmission unit has an annular ridge axially and angularly integral with the control rod and a seat engaged by the ridge and angularly integral with the control element.

18 Claims, 7 Drawing Sheets

(56) References Cited

U.S. PATENT DOCUMENTS

| | | | |
|---|---|---|---|
| 5,407,386 A | 4/1995 | Kish et al. | |
| 9,359,073 B2 | 6/2016 | Hewitt | |
| 10,207,800 B2* | 2/2019 | Wang | B64C 27/82 |
| 11,111,011 B2* | 9/2021 | Bottasso | B64C 27/82 |
| 11,174,012 B2* | 11/2021 | Brunetti | H02K 16/02 |
| 11,577,829 B2* | 2/2023 | Delli Paoli | F16C 21/00 |
| 2017/0253328 A1* | 9/2017 | Wang | B64C 27/78 |

FOREIGN PATENT DOCUMENTS

| | | | |
|---|---|---|---|
| EP | 3753849 A1 * | 12/2020 | B64C 27/78 |
| EP | 3753850 A1 * | 12/2020 | B64C 11/32 |
| WO | WO 93/02916 | 2/1993 | |
| WO | WO-2020260980 A1 * | 12/2020 | B64C 27/605 |

\* cited by examiner

TRANSMISSION UNIT OF AN ANTI-TORQUE ROTOR FOR A HELICOPTER

CROSS-REFERENCE TO RELATED APPLICATIONS

This patent application is a U.S. National Phase Application under 35 U.S.C. § 371 of International Patent Application No. PCT/IB2020/054979, filed on May 26, 2020, which claims priority from European patent application no. 19180445.9 filed on Jun. 17, 2019, all of which are incorporated by reference, as if expressly set forth in their respective entireties herein.

TECHNICAL FIELD

The present invention relates to an anti-torque rotor for a helicopter.

BACKGROUND ART

Helicopters are known to basically comprise a fuselage, a main rotor positioned on the top of the fuselage and rotating about its own axis, and an anti-torque rotor located at the tail end of the fuselage.

Helicopters also comprise, in a known manner, one or more power units, such as turbines for example, and a transmission unit interposed between the turbine and the main rotor adapted to transmit motive power from the turbines to the main rotor.

In greater detail, the anti-torque rotor, in turn, basically comprises:
- a mast rotatable about a first axis;
- a hub rotatable about the first axis; and
- a plurality of blades hinged on said hub, projecting in a cantilever fashion from the hub and each extending along respective second axes transversal to the first axis.

The mast of the anti-torque rotor is driven in rotation by a set of gears driven by the main transmission unit.

The blades of the anti-torque rotor rotate integrally with the mast about the first axis and can be selectively tilted about the second axis, so as to be able to alter the respective angles of attack and consequently adjust the thrust exerted by the anti-torque rotor.

In order to adjust the angles of attack of the respective blades, anti-torque rotors comprise:
- a rod, operatively connected to a pedal operable by the pilot through a mechanical connection or fly-by-wire link and sliding inside the mast along the first axis, but angularly fixed with respect to the first axis;
- a control element, also known as a "spider", integrally rotating with the mast about the first axis and equipped with a plurality of arms connected to respective blades in an eccentric position with respect to the associated second axes; and
- an antifriction bearing, mounted in a sliding manner with respect to first axis, interposed between the rod and control element, and configured so as to transmit an axial load from the rod to the control element.

More specifically, the antifriction bearing, in turn, comprises:
- a radially outer ring fastened on the control element;
- a radially inner ring fastened to the control rod; and
- a plurality of rolling bodies, which roll in respective raceways defined by the radially inner and outer rings.

Operation of the pedal causes the control rod to slide parallel to the first axis. This sliding causes, via the sliding antifriction bearing, the control element to slide parallel to the first axis along a given path of travel.

This sliding causes rotation of the blades about the associated second axes, so as to alter the respective angles of attack by equal amounts associated with the given path of travel.

From the foregoing, it follows that a possible failure of the antifriction bearing would risk making the anti-torque rotor effectively uncontrollable, causing a hazardous situation for the helicopter.

In particular, a first failure situation might occur in the case where rolling bodies and/or the raceways of the inner or outer rings become damaged, for example due to the accidental introduction of foreign bodies inside the bearing, the loss of lubricating grease, or damage to the raceways or surfaces of the rolling bodies.

In this condition, instead of allowing the relative rotation of the control element to the control rod, the antifriction bearing would improperly transfer a twisting moment, progressively growing over time, from the outer ring to the inner ring.

This twisting moment would be transmitted to the control rod, generating a risk of damaging the control rod.

A second failure situation might occur in the case where the rolling bodies break with consequent detachment of the inner ring from the rolling bodies. In this case, the bearing would no longer slide parallel to the first axis, and the rod would no longer cause translation of the control element.

There is awareness in the industry of the need to promptly detect the failure state of the antifriction bearing, so that the pilot can quickly land before the helicopter becomes completely uncontrollable.

There is also awareness in the industry of the need to ensure correct control of the anti-torque rotor, even in the event of failure of the antifriction bearing.

U.S. Pat. No. 9,359,073 describes an anti-torque rotor for a helicopter according to the preamble of claim 1.

In greater detail, U.S. Pat. No. 9,359,073 describes an anti-torque rotor comprising a mast, a rod, and a first and second bearing arranged in series.

The first bearing comprises a first ring rotating with the mast and a second ring.

The second bearing comprises a third ring and a fourth ring.

The third ring of the second bearing and the first ring of the first bearing are connected to each other in a non-rotatable manner.

The anti-torque rotor also comprises a locking device interposed between the third and the fourth ring and adapted to prevent rotation of the third ring with respect to fourth ring. This locking device comprises an element that is breakable in the case of the first bearing failure and not breakable in the case of correct operation of the first bearing.

The solution shown in U.S. Pat. No. 9,359,073 does not allow preserving controllability of the anti-torque rotor in the second failure situation, i.e. in the case where the rolling bodies break with consequent detachment of the inner ring from the rolling bodies.

EP-A-3,216,696 discloses an anti-torque rotor.

U.S. Pat. No. 5,407,386 discloses a fail safe, segmented drive shaft system includes a segment support assembly comprising a ball bearing, for primary rotation, disposed within a journal bearing, for secondary rotation, which is disposed within an elastomeric damper that has a vibration probe placed in it for failure detection, and a coupling assembly comprising a flexible diaphragm for primary, flexible coupling between segments and gear teeth which engage for secondary coupling upon failure of the diaphragm. The teeth are not concentric with the rotational axis, so vibration indicates failure of the primary flexible coupling.

DISCLOSURE OF INVENTION

The object of the present invention is to provide an anti-torque rotor that enables satisfying at least one of the aforementioned needs in a simple and inexpensive manner.

The aforesaid object is achieved by the present invention, in so far as it relates to an anti-torque rotor as defined in the claims.

BRIEF DESCRIPTION OF THE DRAWINGS

For a better understanding of the present invention, two preferred embodiments are described hereinafter, purely by way of non-limitative example and with reference to the accompanying drawings, in which.

BEST MODE FOR CARRYING OUT THE INVENTION

Figure 1:
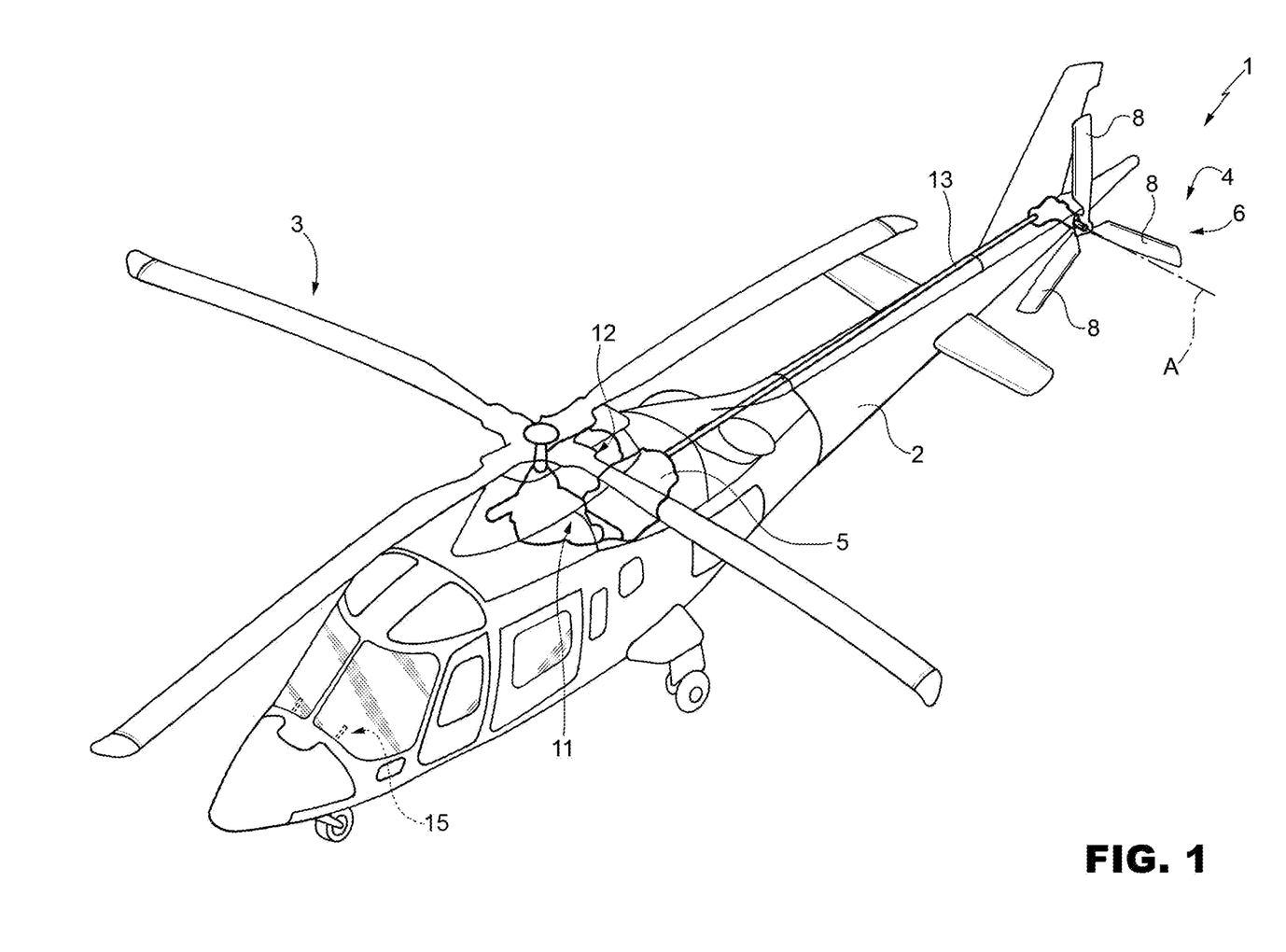
FIG. 1 is a perspective view of a helicopter comprising an anti-torque rotor according to a first embodiment of the present invention.

Referring to FIG. 1, reference numeral 1 indicates, in particular, a helicopter basically comprising:
a fuselage 2;
one or more turbines 5;
a main rotor 3 positioned on the top of the fuselage 2 and rotatable about an axis A; and
an anti-torque rotor 4 located at a tail end of the fuselage 2 and rotatable about an axis of its own, transversal to axis A.

The helicopter 1 also comprises a main rotor transmission unit 11, which transmits motive power from the turbines 5 to the main rotor 3.

In turn, the main rotor transmission unit 11 comprises:
a gear train 12, which transmits motive power from the turbine 5 to the rotor 3; and
a shaft 13, which transmits motive power from the gear train 12 to rotor 4.

In a known manner, rotor 3 is adapted to provide orientable thrust that enables lift-off and forward flight of the helicopter 1.

Rotor 4 generates thrust, which causes counter torque on the fuselage 2.

This counter torque is directed in the opposite direction to the torque exerted by rotor 3.

According to the amount of thrust generated by rotor 4, it is therefore possible to orient the helicopter 1 according to a desired yaw angle, or vary said yaw angle depending on the manoeuvre that it is wished to perform.

Referring to FIGS. 2 to 5B, rotor 4 basically comprises:
a mast 6 rotatable about an axis A and operatively connected to the shaft 13 in a known manner;
a plurality of blades 8, numbering three in the case shown, which extend in a cantilever fashion along respective axes B transversal to axis A; and
a hub 9 externally fastened to a portion of the mast 6, integrally rotating with the mast 6 about axis A and on which the blades 8 are hinged.

Figure 2:
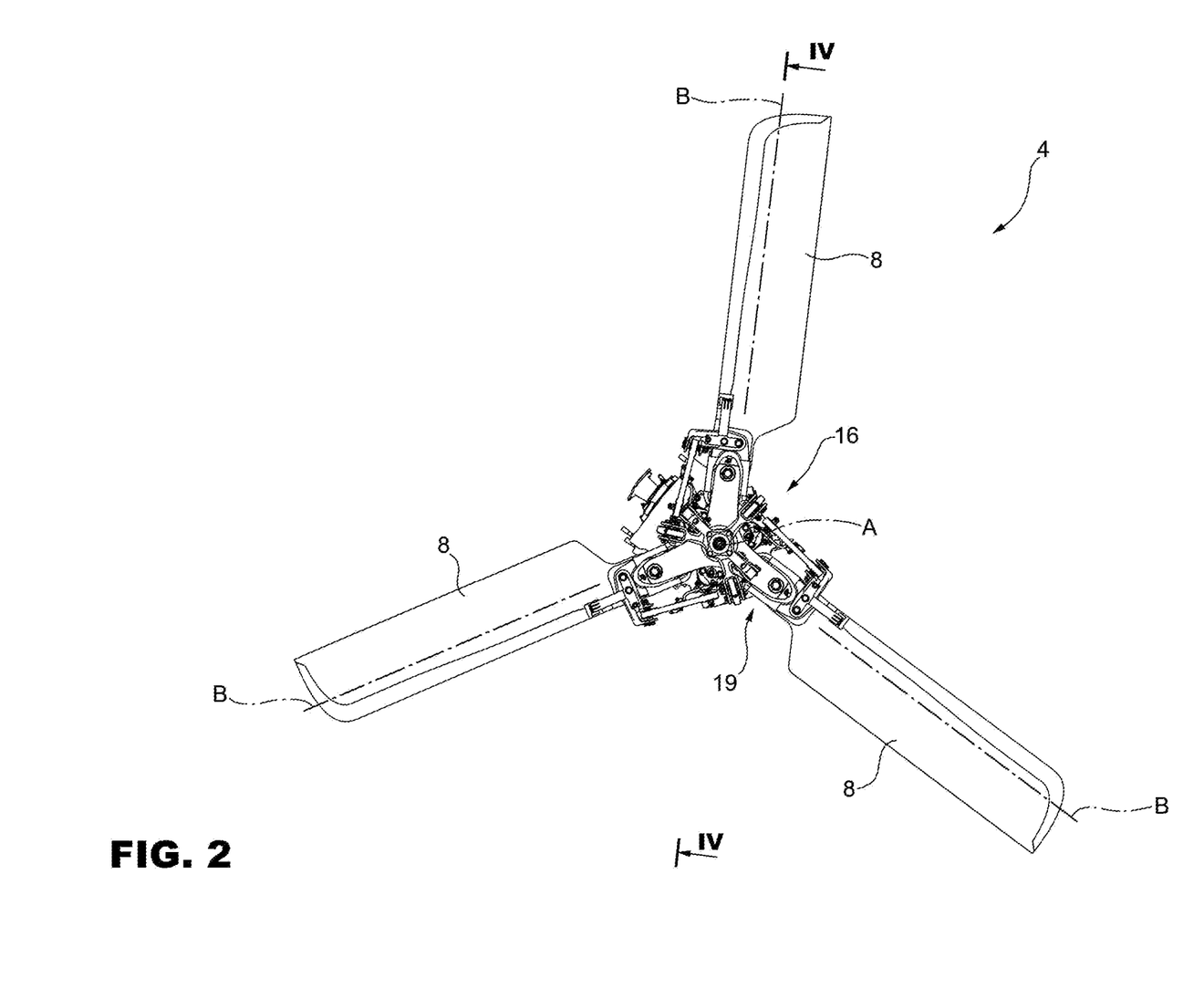
FIGS. 2 and 3 are respectively a top view and a perspective view of the anti-torque rotor in FIG. 1.
Figure 3:
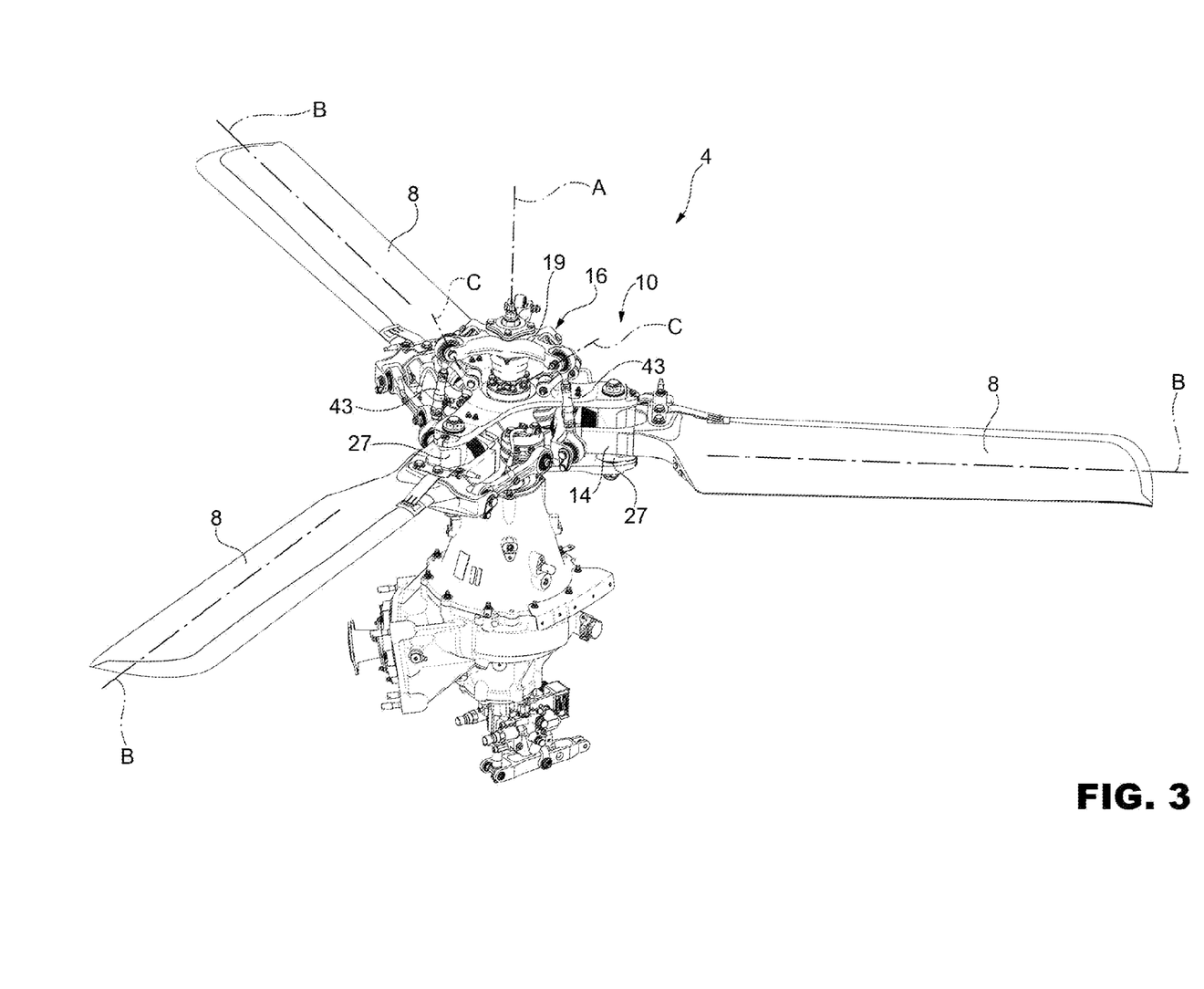
Figure 4:
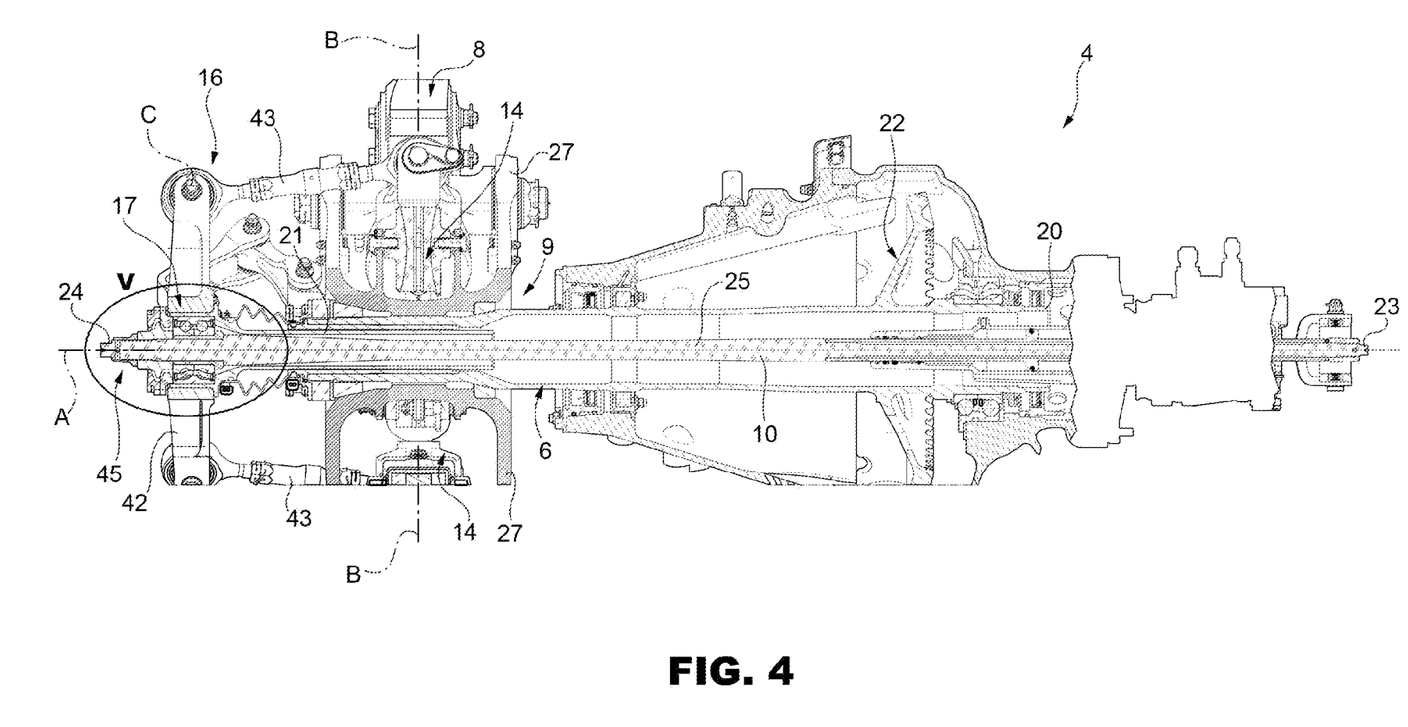
FIG. 4 is a section along the line IV-IV in FIG. 2.

More specifically, the blades 8 are hinged on the hub 9 so as to be:
integrally rotatable with the hub 9 and the mast 6 about axis A; and
tiltable about their respective axes B by the same angles and simultaneously in time, so as to vary the respective angles of attack.

In particular, the hub 9 comprises a plurality of connection elements 27 projecting radially with respect to axis A for connection to the respective blades 8. Each blade 8 also comprises a root portion 14 arranged radially inward with respect to axis A and hinged on the associated connection element 27 of the hub 9.

In order to vary the aforementioned angles of attack, the rotor 4 also comprises:
a flight control 15 (only schematically shown in FIG. 1) operable by the pilot, for example a pedal;
a control rod 10 sliding parallel to axis A and operable by the flight control 15, by means of a mechanical connection or a fly-by-wire method;
a control element 16 rotating integrally with the mast 6 about axis A and connected to the blades 8 in an eccentric manner with respect to the associated axes B; and
a bearing 17 interposed between the rod 10 and element 16 and sliding, jointly with the rod 10, parallel to axis A.

More specifically, the mast 6 is hollow.

The mast 6 also comprises (FIGS. 4 and 5B):
an axial end 20;
an axial end 21, open and opposite to end 20; and
a main portion 22 interposed between the axial ends 20 and 21 and on which the hub 9 is fitted.

The main portion 22 also defines a flange 19 designed to receive motive power from the shaft 13.

More specifically, the mast 6 has a maximum diameter at the flange 19, and a progressively decreasing diameter proceeding from the flange 19 towards the ends 20 and 21.

The rod 10 is partly housed inside the mast 6.

The rod 10 also comprises:
an end 23;
an end 24, axially opposite to end 23; and
a main body 25 running through ends 20 and 21 of the mast 6.

Ends 23 and 24 are located externally to the mast 6 and on the sides of ends 20 and 21, respectively.

The main body 25 is operatively connected to the flight control 15 by a lever mechanism (not shown) or by a wireless control link.

Element 16, in turn, comprises (FIGS. 5A and 5B):
a tubular body 40, partly housed in the mast 6 and connected to the mast 6 in a sliding manner with respect to axis A, and partly housing the rod 10;
a flange 42 extending orthogonally to axis A and fastened to the tubular body 40 on the end opposite to the mast 6; and a plurality of levers 43 (FIG. 4) hinged on flange 42 about respective axes C transversal to axis A and hinged on respective blades 8 in eccentric position with respect to the associated axes B.

Flange 42 and the bearing 17 are housed outside the mast 6 and surround the rod 10.

More specifically, flange 42 and the bearing 17 are arranged on the end opposite to ends 20 and 23 with respect to ends 21 and 24.

Flange 42 is connected to the mast 6 by an annular, variable-length bellows coupling 44, which enables sliding along the axis A.

The levers 43 are generally inclined with respect to axis A and extend from flange 42 towards ends 20 and 23.

The translation of the rod 10 along axis A causes, via the bearing 17, the translation of element 16.

Following the sliding of element 16 along axis A, the levers 43 change their inclination with respect to axis A by the same mutually identical angles, causing the simultaneous rotation of the blades 8 about their respective axes B by the same mutually equal angles.

In particular, the levers 43 are hinged on the root portions 14 of the respective blades 8.

The bearing 17 is able to transmit axial loads parallel to axis A in both directions.

In other words, the bearing 17 is configured in such a way that translation of the rod 10 along axis A in both directions causes the translation of element 16 in the same directions.

The bearing 17 thus defines a transmission unit, which connects the rod 10 and element 16 in an axially integral and angularly movable manner with respect to axis A.

Figure 5A:
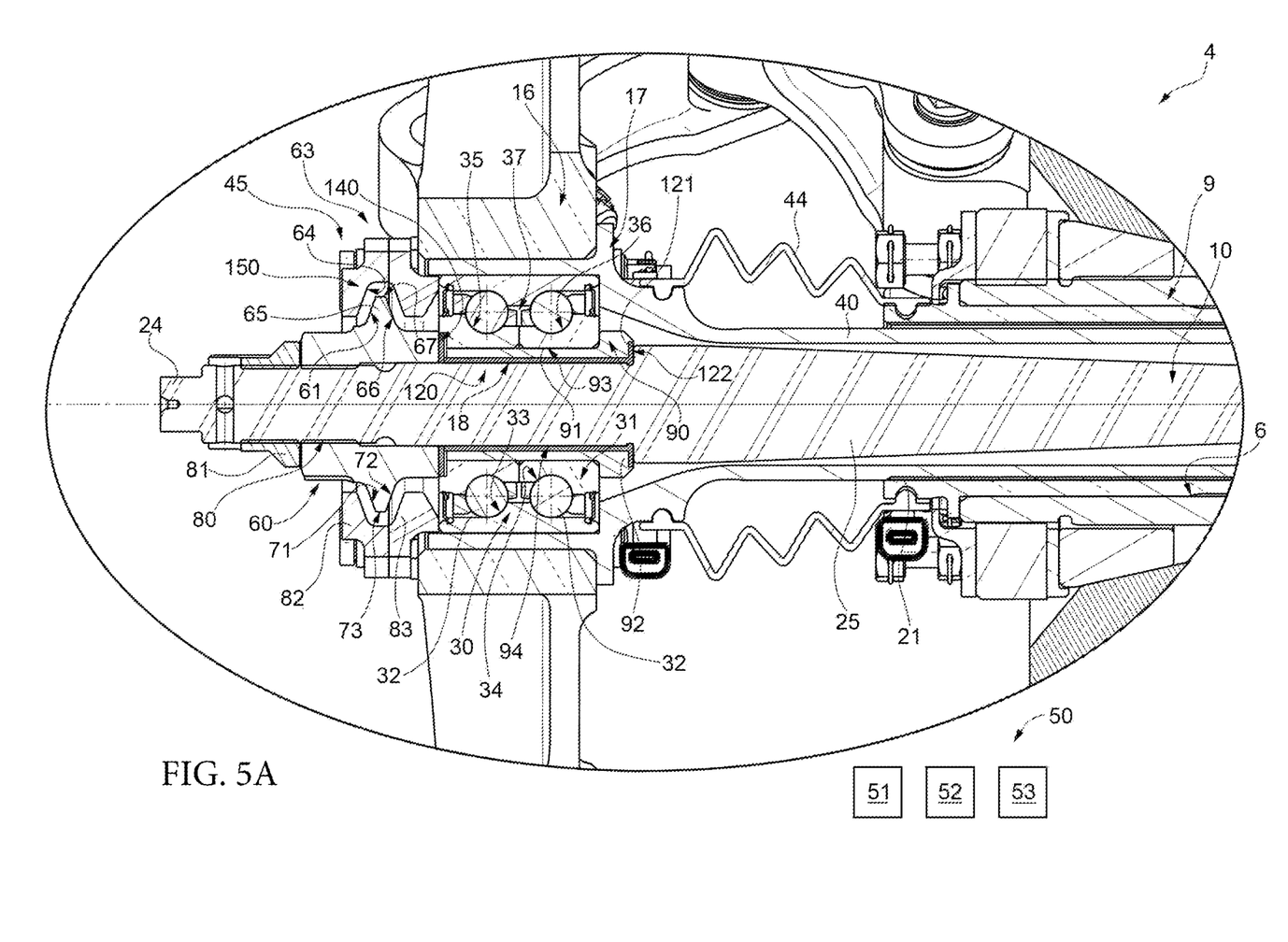
FIG. 5A is an enlarged view of certain details in FIG. 4 and shows the transmission in an inactive state.
Figure 5B:
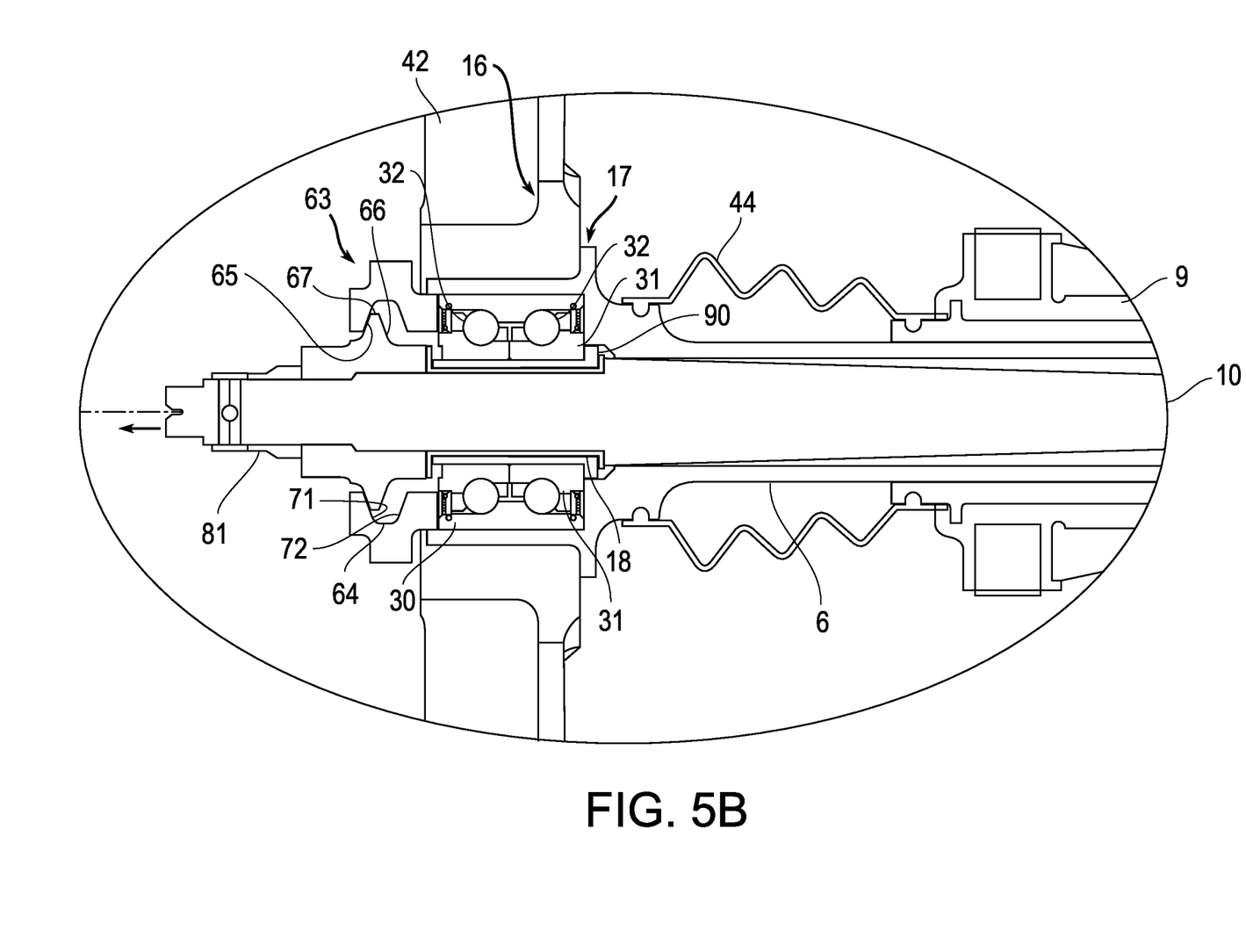
FIG. 5B is an enlarged view of certain details in FIG. 4 and shows the transmission in an active state.

The bearing 17, in turn, comprises:
an outer ring 30 integrally rotating with element 16;
an inner ring 31 integrally sliding with the rod 10; and
a plurality of rolling bodies 32, a double ring of balls in the case shown, rolling on respective raceways 33 and 34 defined by the respective rings 30 and 31.

In the case shown, ring 31 has two shoulders 35 and 36 at mutually opposite axial sides, projecting radially towards ring 30 and defining respective axial abutment surfaces for the rolling bodies 32. The rolling bodies 32 are, in particular, axially interposed between the shoulders 35 and 36.

Furthermore, ring 31 is made in two half-rings, arranged axially in contact with each other in the case shown.

Ring 30 comprises a shoulder 37 axially interposed between shoulders 35 and 36, projecting radially towards ring 31 and defining respective abutment surfaces for the rolling bodies 32. Shoulder 37 is axially interposed between the rolling bodies 32 on a plane of symmetry of the bearing 17 radial to axis A.

Furthermore, outer ring 30 is fastened on the tubular body 40 of element 16 on the opposite side to flange 42 in a direction radial to axis A.

The rotor 4 also comprises a further motive power transmission unit 45 operatively connected to the rod 10 and to element 16.

Transmission unit 45 is available:
in an active configuration (FIG. 5B), in which it causes element 16 to slide along axis A, following the translation of said rod 10 along axis A; or
in an inactive configuration (FIG. 5A), in which it is disengaged from element 16.

In greater detail, transmission unit 45 is set in the active configuration in the event of failure of the bearing 17.

Hereinafter in this description, the term "failure" of the bearing 17 means any operating condition in which the bearing 17 is no longer able to transmit an axial load from the rod 10 to element 16, i.e. to cause the axial translation in both directions of element 16, following the axial translation of the rod 10.

By way of non-limitative example, a first "failure" operating condition occurs when inner ring 31 of the bearing 17 is driven in rotation by the rolling bodies 32 and, due to friction, generates a twisting moment on the rod 10.

A second "failure" operating condition occurs when the rolling bodies 32 of the bearing 17 breaks, so that the rod 10 becomes axially movable with respect to element 16.

Otherwise, the transmission unit 45 is set in the inactive configuration when the bearing 17 correctly allows the relative rotation of element 16 with respect to the rod 10 and prevents any relative translation between element 16 and the rod 10.

The rotor 4 also comprises detection means 50, which comprise:
a sensor 51 adapted to generate a first signal associated with the failure of the bearing 17; and/or
a sensor 52 adapted to generate a second signal associated with the transmission unit 45 being in the active configuration.

The transmission unit 45, in turn, advantageously comprises:
an annular ridge 61 axially integral with the rod 10 and radially projecting from the rod 10; and
a seat 64 engaged by the ridge 61 and angularly and axially integral with element 16.

In greater detail, the transmission unit 45 basically comprises (FIGS. 4 and 5A and 5B):
a cylindrical body 60, a nut in the case shown, integral with the rod 10 and comprising the annular ridge 61 projecting radially from the side opposite to the rod 10; and
a ring 63 integral with element 16 and provided with seat 64 open towards axis A and engaged by the ridge 61.

The ridge 61 is delimited in the axial direction by two walls 65 and 66 opposite to each other.

In the case shown, the ridge 61 has a trapezoidal profile and comprises a further wall 67 interposed between walls 65 and 66. In particular, wall 67 extends parallel to axis A.

In particular, walls 65 and 66 are inclined to one another with respect to axis A, lying on respective planes converging on the opposite side of axis A with respect to the rod 10, and extend symmetrically with respect to a plane radial to axis A.

Seat 64 is delimited in the axial direction by two walls 71 and 72 opposite to each other.

In the case shown, seat 64 also has a trapezoidal profile and comprises a further wall 73 axially interposed between walls 71 and 72. In particular, wall 73 extends parallel to axis A.

Similarly to walls 65 and 66, walls 71 and 72 are inclined to one another with respect to axis A, lying on respective planes converging on the opposite side of axis A with respect to the rod 10, and extending symmetrically with respect to a plane radial to axis A.

The ridge 61 engages the seat 64 with axial and radial play with respect to axis A.

More specifically, when the transmission unit 45 is set in the inactive configuration, the ridge 61 is axially set apart from seat 64, i.e. both walls 66 and 67 of the ridge 61 are set apart from the respective walls 71 and 72 of the seat 64, as shown in FIGS. 5A and 5B.

Contrariwise, when transmission unit 45 is set in the active configuration, the ridge 61 makes axial contact with the seat 64. More specifically, wall 71 makes contact with wall 65, or wall 72 makes contact with wall 66, ensuring that the sliding of the rod 10 in both directions parallel to axis A causes element 16 to slide in both directions.

Furthermore, wall 73 of the seat 64 is radially set apart from wall 67 of the ridge 61.

In particular, the cylindrical body 60 is connected to the rod 10 by a threaded connection 80.

Transmission unit 45 also comprises a lock nut 81, which is screwed onto the rod 10 and is arranged in axial abutment against the cylindrical body 60 on the end axially opposite to the bearing 17.

In particular, the lock nut 81 is screwed on end 24 of the rod 10.

Ring 63 is formed by two half-rings 82 and 83, which are in axial contact with each other.

More specifically, half-ring 83 is axially interposed between half-ring 82 and the bearing 17.

Half-ring 83 is also in axial contact with the bearing 17.

The half-rings 82 and 83 define respective portions of the seat 64.

In particular, the ridge 61 and the seat 64 are coated with a low friction material 150.

More precisely, the low friction material 150 is deposited on walls 66 and 67 of the ridge 61 and walls 71 and 72 of the seat 64.

More specifically, wall 71 makes contact with wall 65, or wall 72 makes contact with wall 66.

Preferably, the rotor 4 also comprises a sleeve 90, radially interposed between ring 31 and the rod 10, and axially interposed between the rod 10 and the cylindrical body 60.

In greater detail, the sleeve 90 extend coaxially to the rod 10.

The sleeve 90 basically comprises:
a main body 91; and
an axial end ridge 92, which has a diameter greater than the main body 91 and projects radially from the main body 91 towards element 16 from the side opposite to axis A.

In greater detail, the main body 91 comprises:
a radially outer surface 93 that makes contact with ring 31 of the bearing 17; and
a radially inner surface 94 that makes contact with a surface 18 of the rod 10 radially external with respect to axis A.

The ridge 92 defines an axial end of the sleeve 90 facing towards end 23 of the rod 10 and arranged in abutment against an annular shoulder 121 of the rod 10.

The sleeve 90 comprises an end surface 140, extending radially and arranged in contact with ring 31.

Preferably, the rotor 4 comprises an interface 120 made of an antifriction material interposed between the rod 10 and the bearing 17, so as to allow rotation of the entire bearing 17 with respect to the rod 10 about axis A.

The interface 120 comprises a first coating in an antifriction material extending axially and arranged on the surface 94 of the sleeve 90 and on surface 18 of the rod 10.

The interface 120 also comprises a second coating extending radially on shoulder 121 and on surface 122 of the ridge 92 in contact with shoulder 121 and axially opposite to ring 31 of the bearing 17.

The interface 120 is adapted to prevent undesired rotation of the rod 10 about axis A. This undesired rotation could occur if, following a failure condition of the bearing 17, the rolling bodies 32 transmit a twisting moment to ring 31, and consequently, by friction, to the sleeve 90.

In the case shown, the sleeve 90 is made of steel and surfaces 93 are 94 are coated with a hard oxide, more specifically tungsten.

Alternatively, the sleeve 90 is made of bronze and has a structure with cavities that entrap lubricant.

The material of surface 18 and surfaces 93 and 94 has a coefficient of friction such as to avoid, in the aforementioned failure condition, the undesired rotation of the sleeve 90 transmitting a twisting moment to the rod 10 sufficient to cause undesired rotation of the rod 10.

The interface 120 also comprises a third coating deposited on the surface of surface 140 in contact with ring 31 of the bearing 17.

Ring 30 of the bearing 17 is axially secured, by respective parts axially opposite to each other, between the tubular body 40 of element 16 and ring 63.

Ring 31 of the bearing 17 is axially secured, by respective parts axially opposite to each other, between the ridge 92 of the sleeve 90 and the cylindrical body 60.

The detection means 50 also comprise a sensor 53 adapted to generate a third signal associated with the rotation of the sleeve 90 about axis A.

Furthermore, the sensor 51 is adapted to detect at least one of the temperature and acceleration of the bearing 17 and/or the sleeve 90.

In use, operation of rotor 3 generates thrust that enables sustaining the helicopter 1 in the air and forward flight of the helicopter 1.

Operation of rotor 3 also generates torque on the fuselage 2 that is balanced by the counter-torque generated by the thrust of rotor 4.

In order to control the yaw angle of the helicopter 1, the pilot operates flight control 15, so as to adjust the pitch of the blades 8 of rotor 4, and consequently the thrust generated by rotor 4.

During operation of rotor 4, the mast 6 is driven in rotation about axis A by the shaft 13 and drives the hub 9, element 16 and the blades 8 in rotation about axis A. The rod 10, instead, remains angularly fixed with respect to axis A.

The operation of rotor 4 is described below, starting from a condition in which the bearing 17 works correctly and transmission unit 45 is consequently set in the inactive configuration.

In this condition, operation of flight control 15 causes translation of the rod 10 in a given direction along axis A.

This translation causes integral translation of the bearing 17 and element 16 along axis A.

In consequence, element 16 moves away from (or closer to) the blades 8 and changes the inclination of the levers 43 with respect to axis B.

This movement of the levers 43 cause the simultaneous rotation by equal angles of the blades 8 about the associated axes B and the consequent adjustment of the angles of attack of the blades 8.

If, following failure of the bearing 17, the rolling bodies 32 improperly transfer a twisting moment to ring 31, and therefore to the sleeve 90, the first and second coatings of the interface 120 prevent the rod 10 from being driven in rotation.

More specifically, the antifriction material, of surfaces 94 and 18 forming the first coating and of surface 122 and shoulder 121 forming the second coating, prevents the undesired rotation of the sleeve 90 from transmitting a twisting moment to the rod 10 sufficient to cause undesired rotation of the rod 10.

The antifriction material of the third coating of the interface 120 deposited on surface 140 prevents undesired rotation of ring 31 of the bearing 17 from causing undesired rotation of ring 63 and the rod 10.

In addition, sensor 51 detects the temperature and acceleration of the bearing 17 and the sleeve 90 and, in cases where these values implicate failure of the bearing 17, generates the first signal.

Furthermore, in the above-described condition, walls 65 and 66 of the ridge 61 are axially set apart from the respective walls 71 and 72 of the seat 64, as shown in FIGS. 5A and 5B.

In consequence, the transmission unit 45 formed by the cylindrical body 60 and ring 63 does not perform an active role in the transmission of movement from the rod 10 to element 16.

In the event of failure, the bearing 17 is no longer able to transmit an axial load from the rod 10 to element 16, i.e. to cause integral translation of the rod 10 and element 16 parallel to axis A.

Sensor 53 generates the third signal, which informs the pilot of the hazardous situation.

In this situation, transmission unit 45 is activated, which enables preserving controllability of the anti-torque rotor 4, at least for a predetermined period of time.

In greater detail, operation of flight control 15 causes translation of the rod 10 and ring 63 up to a position where the ridge 61 makes axial contact with the seat 64 of ring 63.

More specifically, wall 65 (66) of the ridge 61 first makes contact with and then axially pushes wall 71 (72) of the seat 64 of ring 63.

In this way, the transmission unit 45 is in the active configuration, and translation of the rod 10 continues to cause the translation of element 16, via the cylindrical body 60 and ring 63.

Activation of transmission unit 45 generates a small amount of play on element 16 corresponding to the overtravel that the rod 10 must cover to bring the ridge 61 into abutment against the seat 64.

Sensor 52 generates the second signal, which informs the pilot that transmission unit 45 is in the active configuration.

Figure 6:
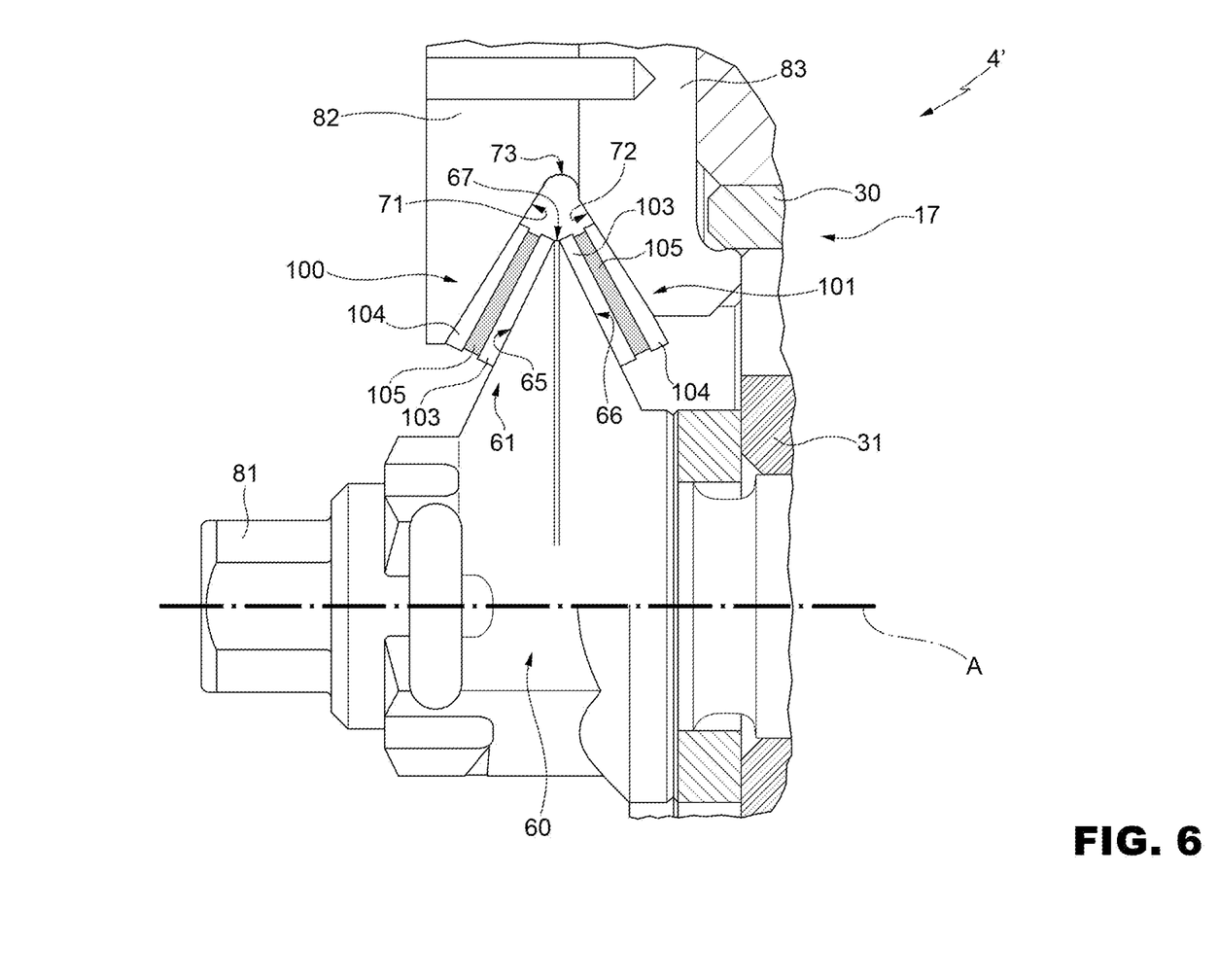
FIG. 6 shows, on a highly enlarged scale, further details of an anti-torque rotor according to a further embodiment of the anti-torque rotor in FIGS. 1 to 5B.

Referring to FIG. 6, reference numeral 4' indicates an anti-torque rotor according to a second embodiment of the present invention.

Rotor 4' is similar to rotor 4 and will be described below only with regard to the differences from the latter; where possible, identical or equivalent parts of rotors 4 and 4' will be indicated with the same reference numerals.

In particular, rotor 4' differs from rotor 4 in that, in order to reduce friction between the ridge 61 and the seat 64, it comprises:
- a bearing 100 interposed between wall 65 of ridge 61 and wall 71 of the seat 64; and
- a bearing 101 interposed between wall 66 of the ridge 61 and wall 72 of the seat 64.

Preferably, the bearings 100 and 101 are roller or ball or needle bearings.

In particular, each bearing 100 (101) comprises:
- a ring 103 fastened to wall 66 (67);
- a ring 104 fastened to wall 71 (72); and
- a plurality of rolling bodies 105, which are interposed between the rings 103 and 104.

In the case shown, the rings 103 and 104 are of a truncated-cone type.

In the case shown, the rolling bodies 105 are needles having respective axes inclined with respect to axis A.

The operation of rotor 4' is similar to that of rotor 4 and is therefore not described in detail.

From examination of the characteristics of the rotor 4 and 4' according to the present invention, the advantages that can be achieved therewith are evident.

In particular, in the case of damage to the rolling bodies 32 that results in physical separation of rings 31 and 30, the translation of the rod 10 brings the ridge 61 into abutment against the seat 64.

In this way, ensuring the correct translation of element 16 and the consequent controllability of the angle of attack of the blades 8 and the rotor 4 and 4'.

Due to this, the ridge 61 and the seat 64 of the transmission unit 45 define an additional and redundant transmission path of control from the rod 10 to element 16 with respect to the bearing 17.

In this way, transmission unit 45 ensures controllability of the angle of attack of the blades 8, even in the event of failure of the bearing 17.

Once the ridge 61 is in abutment against the seat 64, sensor 52 generates second signal, which informs the pilot that transmission unit 45 is in the active configuration. In this way, the pilot is informed that it is advisable to land as soon as possible.

If, following failure of the bearing 17, the rolling bodies 32 improperly transfer a twisting moment to ring 31 and the sleeve 90 causing their rotation, the interface 120 substantially limits the risk that this twisting moment is transmitted to the rod 10.

In this way, the risk that the rod 10 becomes damaged by this twisting moment and that rotor 4 or 4' consequently becomes uncontrollable is substantially limited.

Sensor 53 generates the third signal, which informs the pilot of the hazard condition and that it is advisable to land as soon as possible.

Finally, it is clear that modifications and variants can be made with regard to the rotor 4 and 4' described and illustrated herein without departing from the scope defined by the claims.

The invention claimed is:

1. An anti-torque rotor (4') for a helicopter (1), comprising:
   a mast (6), rotatable about a first axis (A);
   a plurality of blades (8), hinged on said mast (6), extending along respective second axes (B) transversal to said first axis (A) and rotatable about respective said second axes (B) to alter the respective angles of attack;
   a control element (16), sliding along said first axis (A) with respect to said mast (6), integrally rotating with said mast (6), and operatively connected to said blades (8) to cause the rotation of said blades (8) about respective said second axes (B) following a translation of said element (16) along said axis (A);
   a control rod (10), sliding axially along said first axis (A) with respect to said mast (6) and angularly fixed with respect to said first axis (A);
   a first bearing (17), interposed between said control rod (10) and said control element (16), sliding along said first axis (A) with respect to said mast (6) and integrally with said control rod (10), and configured to enable the relative rotation of said control element (16) with respect to said control rod (10) about said first axis (A); and
   a transmission unit (45), which is operatively connected to said control rod (10) and to said control element (16);
   said transmission unit (45) being selectively available:

in an active configuration, wherein said transmission unit (45) causes said control element (16) to slide, following the translation of said control rod (10), along said first axis (A); or in an inactive configuration, wherein said transmission unit (45) is disengaged from said control element (16);

wherein said transmission unit (45) being arranged in said active configuration in the event of failure of said first bearing (17), wherein said bearing (17) is no longer able to transmit an axial load from said rod (10) to said control element (16), causing the axial translation in both directions of said element (16), following the axial translation of said rod (10);

said transmission unit (45) being arranged in said inactive configuration when said first bearing (17) correctly allows relative rotation of said element (16) and said rod (10) and prevents any relative translation between said element (16) and said rod (10);

said transmission unit (45), in turn, comprising:
an annular ridge (61) axially integral with said control rod (10) and radially projecting from a cylindrical body (60); and
a seat (64) engaged by said ridge (61) and angularly and axially integral with said control element (16);

characterized in that said rotor comprises a second bearing (100, 101) interposed between said ridge (61) and said seat (64);

said rotor (4') further comprising detection means (50);

said detection means (50), in turn, comprising a first sensor (52) adapted to generate a signal associated with the fact of said transmission unit (45) being in said active configuration.

2. The rotor according to claim 1, characterized in that said ridge (61) engages said seat (64) with axial play, when said transmission unit (45) is in the inactive configuration; said ridge (61) making contact, in use, with said seat (64), when said transmission unit (45) is in the active configuration.

3. The rotor according to claim 1, characterized in that said ridge (61) and said seat (64) have respective trapezoidal profiles in a plane containing said first axis (A).

4. The rotor according to claim 1, characterized in that at least one of said ridge (61) and said seat (64) is, at least partially, coated with an antifriction material.

5. The rotor according to claim 1, characterized in that said transmission unit (45) comprises:
a sleeve (90) mounted coaxially on said control rod (10); and
a ring (63) mounted on said control element (16) and defining said seat (64) open towards said ridge (61).

6. The rotor according to claim 1, characterized in that said first bearing (17) is a first antifriction bearing (17); said first bearing (17), in turn, comprising:
a first ring (30) integrally rotating with said control element (16) about said first axis (A); and
a second ring (31) radially internal to said first ring (30) with respect to said first axis (A) and integrally sliding with said control rod (10) along said first axis (A).

7. The rotor according to claim 6, further comprising:
an interface (120) made of an antifriction material interposed between said control rod (10) and said second ring (31) of said first bearing (17), so as to enable the rotation of said first bearing (17) with respect to said control rod (10) about said first axis (A); and a tubular element (90) radially interposed between said control rod (10) and said second ring (31), and axially sliding integrally with said control rod (10) and said second ring (31);

said interface (120) comprising at least a first surface (94) of said tubular element (90), which is arranged is contact with said control rod (10), so as to enable the rotation of said tubular element (90) jointly with first bearing (17), with respect to said control rod (10).

8. The rotor according to claim 7, characterized in that said interface (120) comprises a second surface (18) of said control rod (10) having an axial extension and arranged in contact with said first surface (94).

9. The rotor according to claim 7, characterized in that said second ring (31) is axially blocked between said tubular element (90) and a radially projecting ridge (92) of said tubular element (90).

10. The rotor according to claim 9, characterized in that said detection means (50) comprise:
a second sensor (53) adapted to detect the rotation of said tubular element (90); and/or
a third sensor (51) adapted to detect at least one of the temperature and acceleration of said first connection element (16) and/or of said tubular element (90).

11. A helicopter comprising:
a fuselage (2);
a main rotor (3); and
an anti-torque rotor (4, 4') according to claim 1.

12. An anti-torque rotor (4, 4') for a helicopter (1), comprising:
a mast (6), rotatable about a first axis (A);
a plurality of blades (8), hinged on said mast (6), extending along respective second axes (B) transversal to said first axis (A) and rotatable about respective said second axes (B) to alter the respective angles of attack;
a control element (16), sliding along said first axis (A) with respect to said mast (6), integrally rotating with said mast (6), and operatively connected to said blades (8) to cause the rotation of said blades (8) about respective said second axes (B) following a translation of said element (16) along said axis (A);
a control rod (10), sliding axially along said first axis (A) with respect to said mast (6) and angularly fixed with respect to said first axis (A);
a connection element (17), interposed between said control rod (10) and said control element (16), sliding along said first axis (A) with respect to said mast (6) and integrally with said control rod (10), and configured to enable the relative rotation of said control element (16) with respect to said control rod (10) about said first axis (A); and
a transmission unit (45), which is operatively connected to said control rod (10) and to said control element (16);
said transmission unit (45) being selectively available:
in an active configuration, wherein said transmission unit causes said control element (16) to slide, following the translation of said control rod (16), along said first axis (A); or
in an inactive configuration, wherein said transmission unit is disengaged from said control element (16);
said transmission unit (45), in turn, comprising:
an annular ridge (61) axially integral with said control rod (10) and radially projecting from a cylindrical body (60); and
a seat (64) engaged by said ridge (61) and angularly and axially integral with said control element (16);

said transmission unit (45) being arranged in said active configuration in the event of failure of said connection element (17);

said transmission unit (45) being arranged in said inactive configuration when said connection element (17) correctly enables relative rotation of said control element (16) with respect to said control rod (10);

said rotor (4, 4') further comprises detection means (50);

said detection means (50), in turn, comprising a first sensor (52) adapted to generate a signal associated with the fact of said transmission unit (45) being in said active configuration;

said connection element (17) comprising a bearing (17) that includes a plurality of rolling bodies (32);

said second bearing (17), in turn, comprising:
  a first ring (30) integrally rotating with said control element (16) about said first axis (A); and
  a second ring (31) radially internal to said first ring (30) with respect to said first axis (A) and integrally sliding with said control rod (10) along said first axis (A);

said transmission unit (45) being arranged in said active configuration when said plurality of rolling bodies (32) of said connection element (17) in use breaks, so that said control rod (10) becomes axially movable with respect to said control element (16) or when said second ring (31) of said connection element (17) is driven, in use, in rotation by said plurality of rolling bodies (32) and, due to the friction, generates, in use, a twisting moment on the control rod (10);

said transmission unit (45) being arranged in said inactive configuration when said connection element (17) correctly allows, in use, the relative rotation of said control element (16) with respect to said control rod (10) and prevents any relative movement between said control element (16) and said control rod (10);

characterized in that said anti-torque rotor (4, 4') comprises:
  an interface (120) made of an antifriction material interposed between said control rod (10) and said second ring (31) of said bearing (17), so as to enable the rotation of said bearing (17) with respect to said control rod (10) about said first axis (A); and a tubular element (90) radially interposed between said control rod (10) and said second ring (31), and axially sliding integrally with said control rod (10) and said second ring (31);

said interface (120) comprising at least a first surface (94) of said tubular element (90), which is arranged is contact with said control rod (10), so as to enable the rotation of said tubular element (90) jointly with said bearing (17), with respect to said control rod (10);

said interface (120) comprising a second surface (18) of said control rod (10) that is arranged in contact with said first surface (94) of said tubular element (90);

said detection means (50) comprise:
  a second sensor (53) adapted to detect the rotation of said tubular element (90); and/or
  a third sensor (51) adapted to detect at least one of the temperature and acceleration of said bearing (17) and/or of said tubular element (90).

13. The rotor according to claim 12, characterized in that said ridge (61) engages said seat (64) with axial play, when said transmission unit (45) is in the inactive configuration;
  said ridge (61) making contact, in use, with said seat (64), when said transmission unit (45) is in the active configuration.

14. The rotor according to claim 12, characterized in that said ridge (61) and said seat (64) have respective trapezoidal profiles in a plane containing said first axis (A).

15. The rotor according to claim 12, further comprising: a first bearing (100, 101) interposed between said ridge (61) and said seat (64).

16. The rotor according to claim 12, characterized in that at least one of said ridge (61) and said seat (64) is, at least partially, coated with an antifriction material.

17. The rotor according to claim 12, characterized in that said transmission unit (45) comprises:
  a ring (64) mounted on said control element (16) and defining said seat (64) open towards said ridge (61).

18. The rotor according to claim 12, characterized in that said second ring (31) being axially blocked between said tubular element (90) and a radially projecting ridge (92) of said tubular element (90).

* * * * *